March 23, 1948. H. CAMINEZ 2,438,145
METHOD OF MAKING MANIFOLDS FOR ENGINES
Filed Nov. 27, 1942
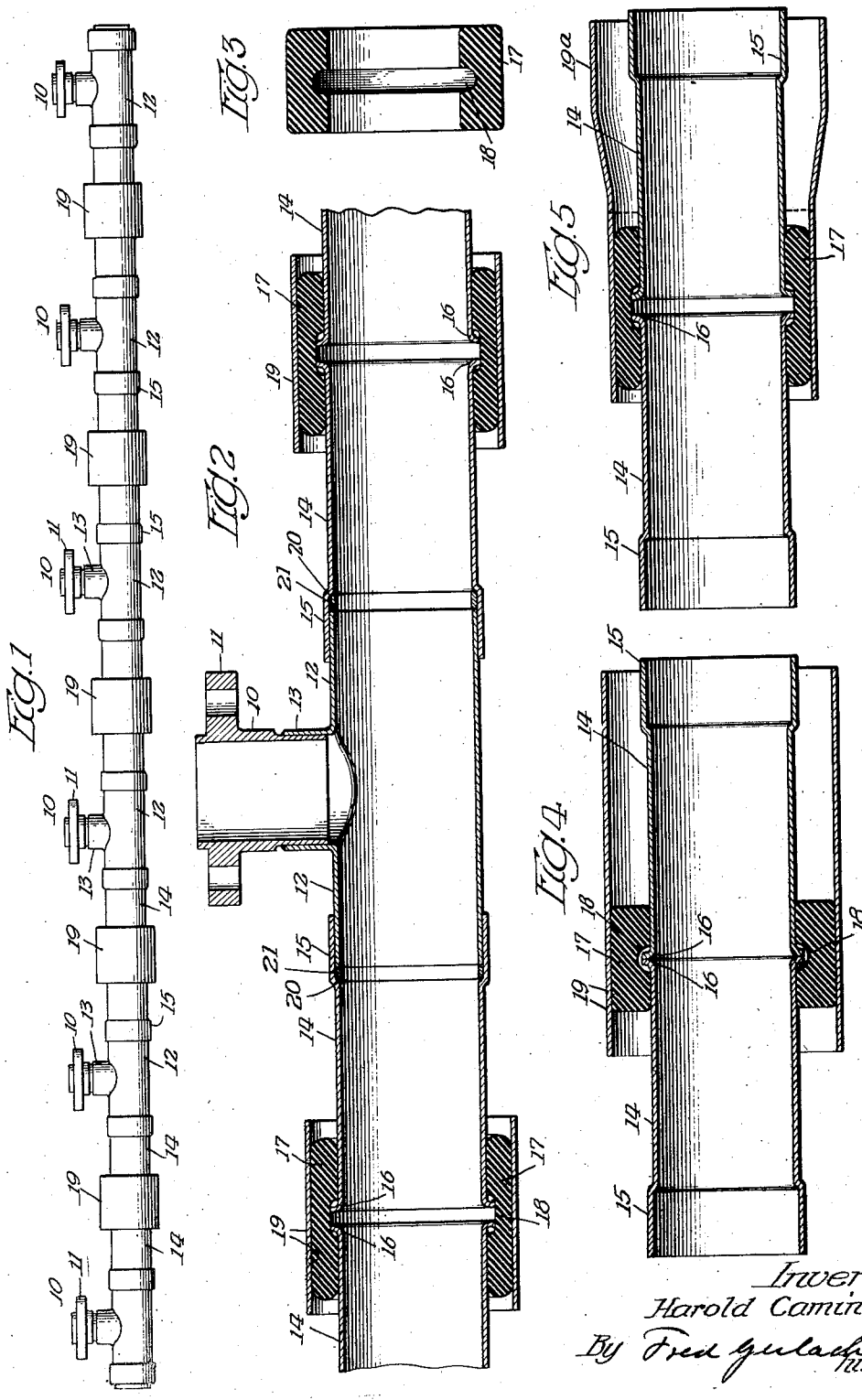
Inventor
Harold Caminez
By Fred Gulach
his Atty Patented Mar. 23, 1948

2,438,145

UNITED STATES PATENT OFFICE 2,438,145

METHOD OF MAKING MANIFOLDS FOR ENGINES

Harold Caminez, Williamsport, Pa., assignor to Avco Manufacturing Corporation, a corporation of Delaware Application November 27, 1942, Serial No. 467,105

1 Claim. (Cl. 29—157)

The invention relates to manifolds, and more particularly to manifolds for cooling fluids used in cooling jackets surrounding the cylinders of internal combustion engines.

Manifolds for this purpose are subjected to expansion and contraction resulting from variations of the temperature of the engine parts, the cooling fluid, the atmospheric temperatures in which the engine is operated, and are also subjected to vibrations from the engines, particularly those used in aircraft.

One object of the invention is to provide a manifold which comprises plural sections connected by joints which permit expansion and contraction resulting from the aforesaid temperature changes and which also tend to prevent or dampen the transmission of vibrations between the branches of the manifold which are connected to the engine-cylinders.

Another object of the invention is to provide an improved method of producing expansion joints between the sections of the manifold.

Another object of the invention is to improve the construction of the connections between the sections of the manifold and the method of making the same.

Other objects of the invention will appear from the detailed description.

The invention consists in the several novel features which are hereinafter set forth and more particularly defined by claim at the conclusion hereof.

In the drawings:

Fig. 1 is a side view of a manifold embodying and made in accordance with the invention.

Fig. 2 is a longitudinal section of a portion of the manifold.

Fig. 3 is a section of the elastic ring before it is placed into connected relation with the sections of the manifold.

Fig. 4 is a longitudinal section of the components of a joint as they are assembled and before the sleeve around the elastic ring is swaged to complete the joint.

Fig. 5 is a longitudinal section of the same components after the sleeve has been swaged.

The invention is exemplified in connection with a manifold which comprises a series of fittings 10 which are usually provided with flanges 11 whereby they may be rigidly secured respectively to the cooling jackets of the cylinders of an engine. Each fitting 10 telescopes into a branch 13 of a tubular T-fitting which comprises a tubular member 12 through which fluid is adapted to pass and with which the branch 13 is in communication. A series of joints of the construction hereinafter described is provided between the tubular T-fittings to form a continuous passage for conducting fluid through the manifold and to the series of branches 13 which are individually connected to the water-jackets around the engine-cylinders. These joints are similar in construction and therefore a description of one is applicable to all.

Between the members 12 of the fittings 10, the manifold includes pre-assembled units, each of which comprises a pair of substantially aligned tubular or pipe sections 14 and an expansion joint or connection between the adjacent ends of said sections. The outer end of each section 14 is expanded as at 15 to telescope around and is soldered, as hereinafter described, to one end of a member 12 of a T-fitting which is rigidly soldered or brazed to a fitting 10 which is fixed to the cooling-jacket of an engine-cylinder. The inner end of each section 14 is provided with an out-turned or flared flange 16. When the T-fittings 10 of the manifold are secured to the jackets of the cylinder the inner ends or flanges 16 are spaced apart sufficiently to permit longitudinal expansion of the sections 14. A ring 17 of suitable elastic material, such as synthetic or other rubber, extends around and overlaps the adjacent ends of each pair of tubular sections 14. The elastic ring 17 is formed at its longitudinal center with an annular groove 18, which is substantially semicircular in cross section, for receiving the out-turned flanges 16 on the adjacent ends of each pair of tubular sections 14. The elastic ring 17 is held compressed around the outer periphery of the sections 14 by a cylindrical circumferentially continuous sleeve 19, the normal diameter of which has been reduced by swaging a sufficient extent and to the desired predetermined diameter for compressing the elastic material in ring 17 to the desired degree around the portions of a pair of adjacent sections 14 which are overlapped by the ring 17 to form a fluid-tight expansion joint. The flanges 16 on the tubular section 14 interfit with the groove 18 in the elastic ring 17 to secure the sections against endwise withdrawal from the elastic ring 17 and sleeve 19. The elastic ring 17, which is surrounded by the sleeve 19, permits longitudinal and radial expansion of the sections 14. The groove 18 in the elastic ring 17 is adapted to receive the flanges 16 so that the predetermined compression produced by the sleeve 19 will not cause cutting of the elastic material by the flanges 16. Each joint forms a fluid-tight connection between a pair of sections 14 which permits expansion of the sections due to temperature variations and also functions to tend to damp the transmission of vibrations between the units of the manifold which are rigidly and individually connected to the jackets of the engine cylinders.

In fabricating the manifold, each pair of sections 14 and the joint described are formed into a unit before assembly of the units into a complete manifold. The elastic ring 17 normally has the cross sectional shape illustrated in Fig. 3 with the groove 18, which is substantially semi-circular in cross section, formed in its inner periphery and at its longitudinal center. The ring 17 is stretched over the flanges 16 on the ends and around the adjacent end-portions of a pair of tubular sections 14 with the flanges 16 disposed in the groove 18, as illustrated in Fig. 4. The sleeve 19, of sufficient diameter to fit snugly around the ring 17 and of sufficient length to extend beyond the ends of said ring 17 when the latter has been substantially compressed, is then slipped endwise around a pair of tubular sections 14 and the elastic ring 17, as illustrated in Fig. 4. Next the sections 14 are clamped together endwise so their flanges 16 will abut against each other and be disposed in the longitudinal center of the annular groove 18, as illustrated in Fig. 4. While the sections are thus clamped together, a sufficient length of the sleeve 19 to extend around and beyond the ends of the subsequently compressed elastic ring 17 will be reduced in diameter by swaging. One end-portion 19ª of the sleeve 19 may be left of normal diameter for convenience in performing the swaging operation. During this swaging the elastic ring will be compressed and elongated in cross section to the contour illustrated in Fig. 5. During this swaging and after the elastic ring 17 has been thus compressed the groove 18 will avoid compression of the elastic material in the ring 17 between flanges 16 and the sleeve 19, which will cause cutting of the elastic material by the flanges. Next, the expanded portion 19ª of sleeve 19 is cut off and removed. After sleeve 19 has been swaged, the pressure used to force the flanges 16 of section 14 into abutting relation will be removed and they will be spread apart to provide a gap between said sections which is sufficient for the longitudinal expansion in the manifold. The elastic ring 17 will permit radial expansion and maintain a tight joint during contraction to form a fluid-tight connection between the sections 14. Next, the brances 12 of the T-fittings are soldered or brazed into the telescoped ends 15 of sections 14 to form a continuous manifold. The fittings 10 are brazed or soldered into the telescoped branches 13 of the T-fittings before the latter may be connected to the sections 14. When all of the T-fittings and joints have been thus connected they will form a complete manifold for conducting cooling fluid to the water-jackets around all of the engine-cylinders with an expansion joint between each adjacent pair of T-fittings.

As an exemplification of the method of producing a connection or joint between the sections of the manifold when the sections 14 have an outside diameter of 1.25"; the flanges 16 have an outer diameter of 1.38"; the elastic ring 17 will have a wall thickness of .32" and the sleeve 19 will be swaged substantially to an internal diameter of 1.66"; and the groove 18, when the ring is compressed, will leave a space of about .15" between the outer edges of the flanges 16 and the sleeve 19. This exemplification results in a fluid-tight flexible and expansible joint between a pair of tubular manifold sections. The flared or flanged end portions of section 14 in conjunction with the groove in the elastic ring serve to locate the ring relatively to the sections 14 during the swaging operation, prevent accidental sliding of the tubular sections out of the elastic ring, and the groove prevents sufficient compression of the elastic ring at the flanges to avoid cutting of the elastic ring during and after swaging of the sleeve around the elastic ring.

The invention provides a manifold for a cooling fluid having T-connections which are rigidly secured to a plurality of cylinder-jackets and tubular connections between the T-connections with joints which are flexible, space the tubing sections apart for expansion and contraction, provide fluid-tight connections between the tubular sections and which permit the sections of the manifold when subjected to vibration by the engine to vibrate independently of one another and with the respective cylinders to which they are secured and thus damp the transmission of vibration from one section to another.

In fabricating the manifold, a pair of short tubular sections are flexibly joined together and the joint between them can be readily completed by swaging before they are assembled with the branches 12 of the T-fittings. After the tubular sections 14 have been connected together in pairs each section is joined to one branch 12 of a T-fitting. When the expanded portion 14 is formed on each tubular section a shoulder 20 is provided adjacent the inner end of the expanded portion. Each section 14 is joined to one branch 12 of the T-fitting by inserting a ring 21 of solder in the expanded portion 15 at the shoulder 20. One end of the branch 12 is then inserted into the expanded portion 15 against the ring 21 of solder. The tubular portion adjacent the ring of solder is then locally heated which causes the solder to flow by capillary attraction and form a fluid-tight joint between each branch 12 and one of the tubular sections 14. Each of the sections 14 is similarly joined to a branch 12 of a T-fitting until the manifold is completed with the desired number of T-sections and expanded joints.

The invention is particularly advantageous with aircraft engines. Heretofore it has been customary to connect manifold sections by sections of hose and clamps. There is always danger or likelihood of the clamps being excessively or insufficiently tightened in servicing an airplane-engine. The present invention provides for uniform and predetermined compression of the elastic ring at the joints. With airplane engines, it is essential to have light-weight, efficient, uniform expansion joints such as result from the present invention.

The invention is not to be understood as restricted to the details set forth since these may be modified within the scope of the appended claim without departing from the spirit and scope of the invention.

Having thus described the invention, what I claim as new and desire to secure by Letters Patent is:

That improvement in fabricating a manifold for an internal combustion engine with an expansion joint for connecting a pair of pipe-sections endwise of each other for the flow of fluid therethrough and provided with out-turned flanges at, and straight cylinder portions adjacent their ends which comprises, assembling an elastic ring in overlapping relation with the end-portions of both sections, the ring in its normal shape having an annular groove in its bore into which the flanges extend when the ring is placed around the sections, assembling around the ring a substantially straight cylindrical sleeve of sufficient length to lap the ring and both of the sections, forcing the flanged ends of the sections together and swaging the ring to straight cylindrical form of reduced diameter while the ring and the sections are confined in the sleeve and the flanges are in said groove, and thereby compressing and elongating the ring between the sleeve and the straight portions of the sections into a fluid-tight fit around sufficient areas of the sections and spreading apart the flanges for flexibly connecting the sections for the flow of fluid therethrough, the groove in the ring preventing excessive compression of the elastic material in the ring between the flanges and the sleeve.

HAROLD CAMINEZ.

REFERENCES CITED

The following references are of record in the file of this patent:

UNITED STATES PATENTS

| Number | Name | Date |
|---|---|---|
| 1,113,994 | Hill | Oct. 20, 1914 |
| 1,265,706 | Bardeen | May 7, 1918 |
| 1,628,302 | Bray | May 10, 1927 |
| 1,783,410 | Cowell | Dec. 2, 1930 |
| 2,016,375 | Kipnis | Oct. 8, 1935 |
| 2,053,626 | Parker | Sept. 8, 1936 |
| 2,154,077 | Sampson | Apr. 11, 1939 |
| 2,167,865 | Beecher | Apr. 1, 1939 |

FOREIGN PATENTS

| Number | Country | Date |
|---|---|---|
| 116,020 | Australia | Oct. 15, 1942 |
| 328,402 | Great Britain | May 1, 1930 |